US012694452B2

(12) United States Patent
Hernandez Fernandez et al.

(10) Patent No.: US 12,694,452 B2
(45) Date of Patent: Jul. 28, 2026

(54) METHOD AND SYSTEM FOR MANAGING PARALLEL PROCESSING FOR ALLOCATIONS

(71) Applicant: JPMorgan Chase Bank, N.A., New York, NY (US)

(72) Inventors: Moises Hernandez Fernandez, San Jose, CA (US); Grant Chang, Fresh Meadows, NY (US); Leonard Eun, Lafayette, CA (US); Amit Varshney, Fremont, CA (US); Shuo Chen, New York, NY (US); Xiaotao Wu, West Windsor, NJ (US); Georgiy Zhikharev, Englewood cliffs, NJ (US); Rafael Forte, Hillsdale, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 178 days.

(21) Appl. No.: 18/392,714

(22) Filed: Dec. 21, 2023

(65) Prior Publication Data

US 2025/0209534 A1    Jun. 26, 2025

(51) Int. Cl.
G06Q 40/06        (2012.01)
(52) U.S. Cl.
CPC .................................. G06Q 40/06 (2013.01)

(58) Field of Classification Search
None
See application file for complete search history.

(56) References Cited

U.S. PATENT DOCUMENTS

| | | | | |
|---|---|---|---|---|
| 2007/0025351 A1* | 2/2007 | Cohen | .................... | G06F 9/542 |
| | | | | 370/390 |
| 2022/0122181 A1* | 4/2022 | Kotarinos | .............. | G06Q 40/08 |
| 2022/0318914 A1* | 10/2022 | Wu | ........................ | G06Q 40/06 |
| 2023/0273844 A1* | 8/2023 | Nugent | .................. | G06Q 40/04 |
| | | | | 719/314 |

* cited by examiner

*Primary Examiner* — Matthew S Gart
*Assistant Examiner* — Mark A Malkowski
(74) *Attorney, Agent, or Firm* — Guntin & Gust, PLC; Andrew Gust

(57)        ABSTRACT

Aspects of the subject disclosure may include, for example, segregating unique combinations for a portfolio of items into partitions; routing the partitions to an optimization service platform comprising GPUs to apply, via parallel processing by the GPUs, an optimization allocation algorithm according to parameters and analyze each of the combinations of the partitions resulting in optimal outcomes for each of the partitions; and consolidating the optimal outcomes for each of the partitions to determine a suggested portfolio selected from the items. Other embodiments are disclosed.

20 Claims, 10 Drawing Sheets

210

| Solution / Device / Precision | Throughput in combinations per second |
|---|---|
| Recurrent-sequential / CPU* / FP64 | 52530 |
| Parallel / NVIDIA T4 GPU / FP64 | 990099 |
| Parallel / NVIDIA T4 GPU / FP32 | 8000000 |
| Parallel / NVIDIA T4 GPU / FP16 | 11764705 |
| Parallel / NVIDIA V100 GPU / FP64 | 14285714 |
| Parallel / NVIDIA V100 GPU / FP32 | 25000000 |
| Parallel / NVIDIA V100 GPU / FP16 | 36363636 |
| Parallel / NVIDIA A10 GPU / FP64 | 1877934 |
| Parallel / NVIDIA A10 GPU / FP32 | 20000000 |
| Parallel / NVIDIA A10 GPU / FP16 | 28571428 |

* Intel(R) Xeon(R) Platinum 8259CL CPU @ 2.50GHz

| Step Size % | N Combinations | Recurrent-sequential / CPU / FP64 | Parallel / 8 x NVIDIA V100 GPU / FP64 | Parallel / 8 x NVIDIA V100 GPU / FP32 | Parallel / 8 x NVIDIA V100 GPU / FP16 |
|---|---|---|---|---|---|
| | | | Latency in hours | | |
| 1 | 4.4169E+15 | 23356519* | 10735* | 6134* | 4217* |
| 2 | 2.16015E+12 | 11422* | 5.25 | 3.001 | 2.06 |
| 3 | 28760021745 | 152.08* | 0.069 | 0.039 | 0.027 |
| 4 | 1852482996 | 9.79* | 0.0045 | 0.0025 | 0.001 |
| 5 | 225792840 | 1.19 | 0.0005 | 0.0003 | 0.0002 |

*Latency estimated using reported throughputs.

| N Portfolio Accounts | N Combinations | Latency in hours | | |
|---|---|---|---|---|
| | | Recurrent-sequential / CPU / FP64 | Parallel / 8 x NVIDIA V100 GPUs / FP32 | Parallel / 8 x NVIDIA V100 GPUs / FP32 With concentration constraints filtering |
| 12 & cash | 2257792840 | 1.19 | 0.000314 | 0.000058 |
| 13 & cash | 5731664440 | 3.03 | 0.000797 | 0.000147 |
| 14 & cash | 1391975640 | 7.36* | 0.001933 | 0.000035 |
| 15 & cash | 3247943160 | 17.18* | 0.004511 | 0.00083 |
| 16 & cash | 7307872110 | 38.64* | 0.01015 | 0.0018 |
| 17 & cash | 15905368710 | 84.11* | 0.022092 | 0.004 |
| 18 & cash | 33578000610 | 177.56* | 0.046636 | 0.0086 |
| 19 & cash | 68923264410 | 364.47* | 0.095728 | 0.017 |
| 20 & cash | 1.37847E+11 | 728.93* | 0.191453 | 0.035 |

*Latency estimated using reported throughputs.

METHOD AND SYSTEM FOR MANAGING PARALLEL PROCESSING FOR ALLOCATIONS

FIELD OF THE DISCLOSURE

The subject disclosure relates to methods and systems for managing parallel processing for allocations.

BACKGROUND

Solving enumeration problems efficiently can be difficult and, in most cases, impossible due to the size of the problem, especially with traditional computational architectures. As the number of factors taken into consideration increases, the number of combinations increase factorially. An example is portfolio optimization problems.

Portfolio optimization is a problem of finding optimal combinations of investments from a universe of investments while considering objectives and restricted by constraints. In fact, many investment practitioners deal with portfolio optimization problems daily, which require one to invest in various instruments according to a target risk and return profile. Due to the nature of the problem, solving this via a traditional enumeration algorithm would have a high time complexity and is difficult to achieve. In addition, there are currently no efficient or scalable methods to solve such large enumeration problems. Ideally, one could iterate through every possible combination and solve a utility function if the problem is small enough. However, since most problems are large, using a naive matrix-based approach would lead to memory limitations as well as computations that are sequential, typically leading to single threaded performance.

BRIEF DESCRIPTION OF THE DRAWINGS

Reference will now be made to the accompanying drawings, which are not necessarily drawn to scale, and wherein:

FIG. 2E is a table showing throughput data for an exemplary embodiment and for a sequential-recurrent CPU solution and parallel GPU solutions.

FIG. 2G is a table showing latency data for an exemplary embodiment and for a sequential-recurrent CPU solution and parallel GPU solutions.

FIG. 2H is a table showing latency data for an exemplary embodiment and for a sequential-recurrent CPU solution and parallel GPU solutions.

DETAILED DESCRIPTION

Figure 1:
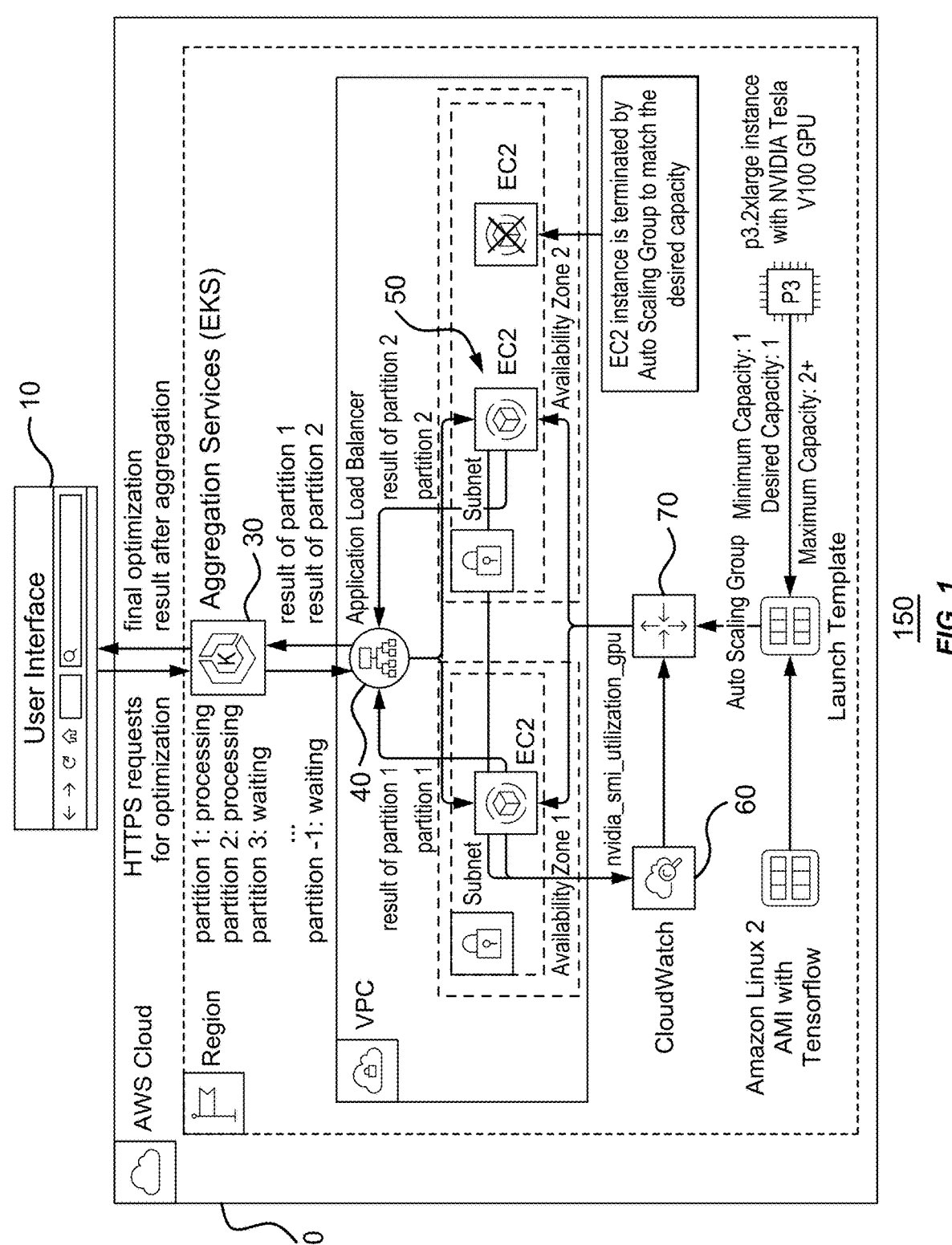
FIG. 1 is a block diagram of an example, non-limiting embodiment of a system or architecture in accordance with various aspects described herein.

The subject disclosure describes illustrative embodiments of applying a random access method for combinations in allocation analyses. One or more embodiments can be facilitated through use of multi-core or many-core processing. One or more embodiments can be facilitated through use of parallel processing. One or more of the embodiments can apply parallel processing and/or validity combination pruning of datasets to various complex analyses, including balanced allocations; discrete optimizations; financial portfolio optimization or selections; computational load balancing (e.g., distributing software-programs to be executed, where some programs may need more than one resource) amongst different computational resources such as AWS instances to minimize computational time, and/or cost; warehouse storage such as by distributing packages of different sizes amongst storage space in the warehouse to minimize occupied space, or optimize some logistics movements; parking lots such as by distributing vehicles of different types and/or sizes amongst parking spaces, to maximize occupancy, and/or optimize charging strategy; and so forth. In one or more embodiments, a percentage of money can be distributed amongst different assets to maximize returns and minimize tracking error.

One or more aspects of the subject disclosure is a method including receiving, by an aggregation service platform including a processor, a request for investment strategies. The method includes segregating, by the aggregation service platform, unique combinations for a portfolio of financial assets into partitions, where a number of the unique combinations is based on a number of the financial assets and is based on an incremental value. The method includes routing, by the aggregation service platform, the partitions to a filtering service platform comprising first Graphics Processing Units (GPUs) to cause the filtering service platform to evaluate validity for each of the unique combinations of the partitions resulting in validated combinations. The method includes repackaging, by the aggregation service platform, the validated combinations for the portfolio of the financial assets into refined partitions. The method includes routing, by the aggregation service platform, the refined partitions to an optimization service platform comprising second GPUs to cause the optimization service platform to apply, via parallel processing by the second GPUs, an optimization investment algorithm according to investment parameters and analyze each of the validated combinations of the refined partitions resulting in optimal outcomes for each of the refined partitions. The method includes consolidating, by the aggregation service platform, the optimal outcomes for each of the refined partitions to determine a suggested portfolio selected from the financial assets. The method includes providing, by the aggregation service platform, a response for the investment strategies, where the response identifies the suggested portfolio selected from the financial assets. The parameters (e.g., investment parameters) can be of various types including historical return information for particular investments or indexes of investments (e.g., price, dividends, etc.), time data (e.g., length of time for investment, age of investor, etc.), types of investments (stocks, bonds, etc.), criteria for investments (location, industry, etc.), and so forth.

One or more aspects of the subject disclosure include a non-transitory computer-readable medium, comprising executable instructions that, when executed by a processing system including a processor, facilitate performance of operations. The operations include receiving a request for allocation strategies where the request is associated with items, parameters, and incremental value information; and segregating unique combinations for the items into partitions, where a number of the unique combinations is based on a number of the items and is based on an incremental value from the incremental value information, and where the segregating is based on applying a random access method. The operations include routing the partitions to an optimization service platform comprising processing functionality to cause the optimization service platform to apply, via parallel processing by the processing functionality, an optimization selection algorithm according to the parameters and analyze each of the combinations of the partitions resulting in optimal outcomes for each of the partitions. The operations include consolidating the optimal outcomes for each of the partitions to determine a suggested group selected from the items; and providing a response for the allocation strategies, where the response identifies the suggested group selected from the items.

One or more aspects of the subject disclosure include a device having a processing system including a processor; and a memory that stores executable instructions that, when executed by the processing system, facilitate performance of operations. The operations include receiving user input for a request for investment strategies, where the request is associated with financial assets, investment parameters, and an incremental value. The operations include providing the request to an aggregation service platform including a processor that causes the aggregation service platform to: segregate unique combinations for a portfolio of the financial assets into partitions, where a number of the unique combinations is based on the incremental value and a number of the financial assets; route the partitions to a filtering service platform comprising first GPUs to cause the filtering service platform to evaluate validity for each of the unique combinations of the partitions resulting in validated combinations; repackage the validated combinations for the portfolio of the financial assets into refined partitions; route the refined partitions to an optimization service platform comprising second GPUs to cause the optimization service platform to apply, via parallel processing by the second GPUs, an optimization investment algorithm according to the investment parameters and analyze each of the validated combinations of the refined partitions resulting in optimal outcomes for each of the refined partitions; and consolidate the optimal outcomes for each of the refined partitions to determine a suggested portfolio selected from the financial assets. The operations include receiving a response for the investment strategies from the aggregation service platform, where the response identifies the suggested portfolio selected from the financial assets; and presenting the suggested portfolio.

FIG. 1 is a diagram of an example system or architecture 150 in accordance with various aspects described herein. System 150 is illustrated utilizing components and functionality of cloud computing. In other embodiments, the system 150 can operate with or without the use of cloud computing, such as through locally-hosted equipment (e.g., multi-core processors), data centers, edge computing, premises equipment and so forth. In other embodiments, a combination of cloud and non-cloud computing can be utilized to implement the functionality described herein. System 150 can be part of or used in conjunction with other systems or networks, such as communicating over a Service Provider Network (not shown) with various end user devices, servers, data centers, cloud platforms, and so forth. In one or more embodiments, system 150 is accessible by, or is part of, an enterprise network. Other components and functionality not shown may also be used by or with system 150 in order to facilitate analyses via parallel processing as described herein.

System 150 is illustrated utilizing particular components and functionality, such as Amazon Web Service (AWS) cloud, Elastic Container Service for Kubernetes (EKS), EC2, CloudWatch, Linux 2 AMI with TensorFlow, Auto Scaling Group, and NVIDIA GPUs. However, various other components and functionality associated with various other entities can be utilized, such as for parallel processing; cloud computing; automatic scaling and management; creation of virtual servers; deep learning; monitoring complete stacks (e.g., applications, infrastructure, network, and services); utilizing alarms, logs, and events data to take automated actions; and so forth.

In one or more embodiments, system 150 can achieve parallelism in processing by producing combinations independently. As an example, an allocation algorithm can be implemented through use of data parallelism via a data parallel architecture to provide a model that has greater efficiency. In one or more embodiments, tensors can be offloaded or otherwise assigned across multiple processing systems, such as GPUs. In this example, each shard can be processed separately and concurrently (e.g., asynchronously or synchronously) across a number of GPUs. Although the data is sharded across different GPUs, the system 150 can be scaled out to any arbitrary length depending on the size/complexity of the problem being analyzed without the need for any synchronization until the very end. For example, the process for each shard of data can be local to each GPU, which reduces any communication needed between GPUs and makes the whole pipeline more parallelizable.

In one or more embodiments, system 150 can include or can access an aggregation service platform 30 (e.g., a client service). For instance, the aggregation service platform 30 can operate in the Cloud. In one or more embodiments, the aggregation service platform 30 can partition (e.g., all) possible allocation combinations (e.g., investment portfolio construction combinations), employing a sharding strategy (e.g., specified) such as hashing-based sharding or range-based sharding, thereby enabling parallel processing.

In one or more embodiments, system 150 can include or can access an optimization service platform 50. For instance, each partition can subsequently be automatically allocated to the optimization service platform 50, such as through instances (e.g., EC2) equipped with GPUs and TensorFlow. In one or more embodiments, an application load balancer 40 can be employed for allocating or otherwise distributing the partitions to the parallel processing occurring at the optimization service platform 50, such as guided by a predefined load balancing algorithm (e.g., a round robin method).

In one or more embodiments, the real-time outcome can undergo continuous or frequent updates inside the aggregation service platform 30 in response to feedback of each individual partition from the tensor worker instances 50. In one or more embodiments, once the last partition's result has been received and consolidated, the aggregation service platform 30 can initiate a dissemination of a final optimization result, such as to a user interface (e.g., an end user device that requested the allocation optimization) and/or to an event queue.

In one or more embodiments, system 150 can dynamically and strategically employ a distribution of tensor instances featuring GPU resources across multiple availability zones in order to augment robustness, provide redundancy, and provide failover capabilities.

In one or more embodiments, system 150 can include or can access a monitoring system 60 (e.g., CloudWatch) which can continuously or frequently monitor GPU utilization across various compute instances. For instance, the monitoring system 60 can issue alarms or notices to various equipment, including an auto scaling group platform 70 in cases of tensor instance overloads or underloads. In one or more embodiments in response to an alarm(s) such as from the monitoring system 60, the auto scaling group platform 70 can autonomously generate and/or terminate compute instances (e.g., EC2 instances) as needed (or determined) to improve or optimize resource utilization, effectively managing operational costs.

In one or more embodiments, system 150, through use of its particular architecture, can dynamically adjust computing resources being applied to complex analyses based on workload, which allows managing allocation analyses that are orders of magnitudes larger than traditional systems can efficiently process (if at all).

In one or more embodiments, system 150 can intelligently select and allocate only feasible or valid combinations in order to mitigate the fact that computing capacity is not infinite and that, if left unconstrained, accepting all combinations would overwhelm resources.

In one or more embodiments, information, calculations, solutions or other data can be stored (in whole or in part) via a cache mechanism (e.g., memoization).

In one or more embodiments, system 150 can employ various techniques to gain efficiency in computing, such as limiting processing resources to valid combinations. In allocation analyses, N number of combinations take up a particular amount of memory space and are used at a subsequent step to produce metrics within the GPU. GPUs are only able to accommodate a limited capacity while returning a result in a finite amount of time. However, system 150 provides an improvement in computing technology because of the efficiencies it provides through limiting analyses to valid combinations, as opposed to a naïve solution which sends all of the combinations without discarding any of the combinations that are not feasible resulting in taking up resources that could be used for valid combinations instead.

In one or more embodiments, system 150 can include various other components, such as an input module, a preprocessor, and other components and/or functionality that facilitate the optimization analysis. Some or all of these components, functions and/or modules, which may be referred to as programs, processors, or agents, may be realized based on execution of instructions or data by one or more processors of a computing system. In various embodiments, the system 150 may be used to provide optimal allocations by generating independently any of the possible combinations and applying parallelized processing which takes advantage of multi/many-core architectures such as GPUs. In one or more embodiments, since combinations can be generated independently, they do not need to all be kept in memory simultaneously, and instead they can be generated iteratively which alleviates memory requirement issues.

In one or more embodiments, the system 150 may include additional functional modules, such as those for gathering performance results and presenting (e.g., displaying) data regarding the results. While various components, modules, etc. may have been illustrated in FIG. 1 as separate components, modules, etc., it will be appreciated that multiple components, modules, etc. can be implemented as a single component, module, etc., or a single component, module, etc. can be implemented as multiple components, modules, etc. Additionally, functions described as being performed by one component, module, etc. may be performed by multiple components, modules, etc., or functions described as being performed by multiple components, modules, etc. may be performed by a single component, module, etc.

In one or more embodiments, system 150 can determine or otherwise identify one or more (e.g., ranked) optimal solutions that have a finite set of factors by leveraging enumeration. As an example, enumeration analysis can be performed efficiently through mathematical optimization by selection of best elements, regarding some criterion, from some set of available alternatives. System 150 can overcome limitations associated with using enumeration algorithms in discrete optimization, including computational inefficiency. System 150 can account for the fact that as the number of factors taken into consideration increases, the number of combinations increase factorially.

In one or more embodiments, system 150 can be applied to financial portfolio optimization where optimal combinations of investments are found or identified from a universe of investments while considering objectives and restricted by constraints. System 150 can be made available to users or investment practitioners that deal with portfolio optimization, which require one to invest in various instruments according to a target risk and return profile. System 150 provides efficiencies in time savings and memory management, as well as processing resource efficiency as compared to traditional enumeration techniques which have a high time complexity and is difficult to achieve. System 150 further provides a scalable methodology to analyze large enumeration problems. In one or more embodiments, the existence of constraints associated with or otherwise part of the analysis can allow removal of some of the combinations from the optimization analysis and thus provide efficiency.

In one or more embodiments, system 150 can operate as a parallel framework for handling large combinatorial analyses, taking advantage of access to many core processors and removing the computational limitations when working with large enumeration problems. For instance, system 150 can apply a random-access methodology for the combinations in various balanced allocation analyses (e.g., a Balls & Bins problem). This approach allows system 150 to exploit inherent independence of the problem to address how different candidate solutions can be split or otherwise divided from each other to mitigate memory limitations often associated with big data while also grouping enough of these candidates together to take advantage of parallelism in the processing (e.g., in one or more GPUs). Additionally, using this distributionally robust approach, system 150 provides an improvement over a single threaded performance typically found in traditional enumeration strategies. System 150 can further address computational time complexity challenges by scaling such as with TensorFlow and/or multiple GPUs (or other processing devices or functionality). In one or more embodiments, system 150 can apply a multi-threaded approach to solve large scale combination problems based on a random-access method reformulation for the combinatorial problem complemented with a many-core architecture.

Figure 2A:
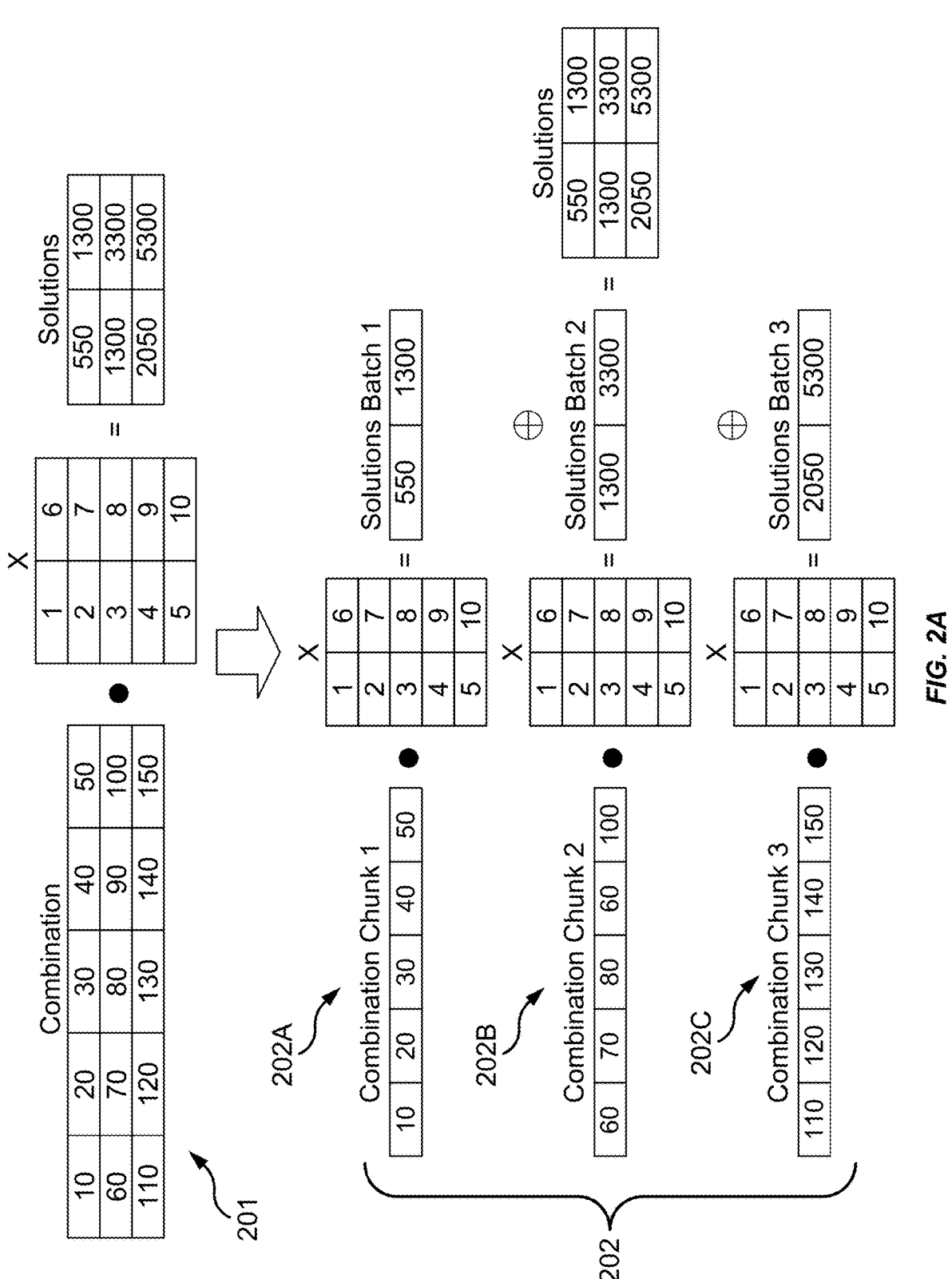
FIG. 2A is a diagram of an example, non-limiting embodiment of partitioning calculations into bunches or chunks in accordance with various aspects described herein.

In one or more embodiments of functionality performed by system 150, a random-access method can be applied to a combinatorial analysis in order to address memory limitations and/or facilitate faster compute. As an example, batch processing can be employed since splitting a combination matrix into multiple chunks yields the same solutions as using the entire matrix in the computation. Batch processing provides for each chunk being processed separately and executed in parallel with the results of each chunk harmonized at a later step(s), thereby eliminating memory limitations. For instance, as shown in FIG. 2A, vectors-matrix multiplication illustrates how a problem can be split into multiple batches (e.g., residing on one or more different GPUs).

System 150 can split the combination matrix 201 into N multiple chunks 202A-C and perform vectors-matrix multiplications on each chunk, then N solution vectors can be derived, which can be leveraged to get the same solutions as the full matrix computation. In this simplified example, given that the batches can be run independently, system 150 can derive the batch solutions on different processing units (e.g., GPUs) with some harmonization to be performed at a later step. Therefore, with this simple example, system 150 can use the same principles to reconstruct the same solution vectors via the full matrix or by matrix chunks method. In one or more embodiments, system 150 can apply these principles to more complex analyses, including complex balanced allocation requests, to generate all the possible combinations, without repetition, independently and/or with the possibility of random access.

System 150 can perform more complex balanced allocation analyses as follows. An allocation request may require distributing n indistinguishable items (e.g., balls) into k distinguishable containers (e.g., bins or boxes), without exclusion, which corresponds to forming a combination of size n with unrestricted repetitions, taken from a set of size k. The total number of combinations m is:

$$m = C(n + k - 1, n) = \frac{(n + k - 1)!}{n! \, (k - 1)!}$$

A traditional solution for enumerating all these possible combinations is via recursive methods. Having a recursive function F (balls, bins), the base case would be defined as:
  If (bins==1) F assigns all the remaining balls to the unique bin
Otherwise, F would iterate over each possible number of balls to assign to the current bin and would call recursively to F for computing the balls assigned to the remaining bins:
  For b in [0 . . . balls]:
    Assign b balls to current bin
    F(balls−b, bins−1)
This traditional method has $O(n^k)$ time complexity, and is hardly parallelizable since the generation of combinations requires following a certain order where there are dependencies between recursive calls. While execution time might be somewhat improved by storing solutions via a cache mechanism (i.e., memoization) or by filling several elements simultaneously; however, this does not solve the dependencies and parallelizable limitations. Additionally, the memory requirements can explode quickly as n and/or k are increased, since its complexity order is factorial.

In one or more embodiments, system 150 can perform parallel processing by assuming a sorted table with all the combinations (following ascending order for items (e.g., balls) assigned to the most left columns), and by generating independently any of the possible combinations given an ID, where the ID indicates the number of rows within that table. This methodology is suitable to be parallelized and can take advantage of many-core architectures such as GPUs. Additionally, storage efficiency is improved by system 150 since combinations can be generated independently and there is no need to keep all of them in memory simultaneously. In one or more embodiments, system 150 can generate the combinations (or groups of them) iteratively and therefore alleviate any memory requirement concerns.

System 150 can apply a random access method for the combinations in an allocation analysis. One or more of the exemplary embodiments are described with respect to a Balls & Bins allocation, however, it should be understood that the embodiments, portions of the embodiments and/or combinations of the embodiments can be applied to various analyses, including different types of allocation requests such as financial portfolio optimization, computational load balancing, and so forth.

Figure 2B:
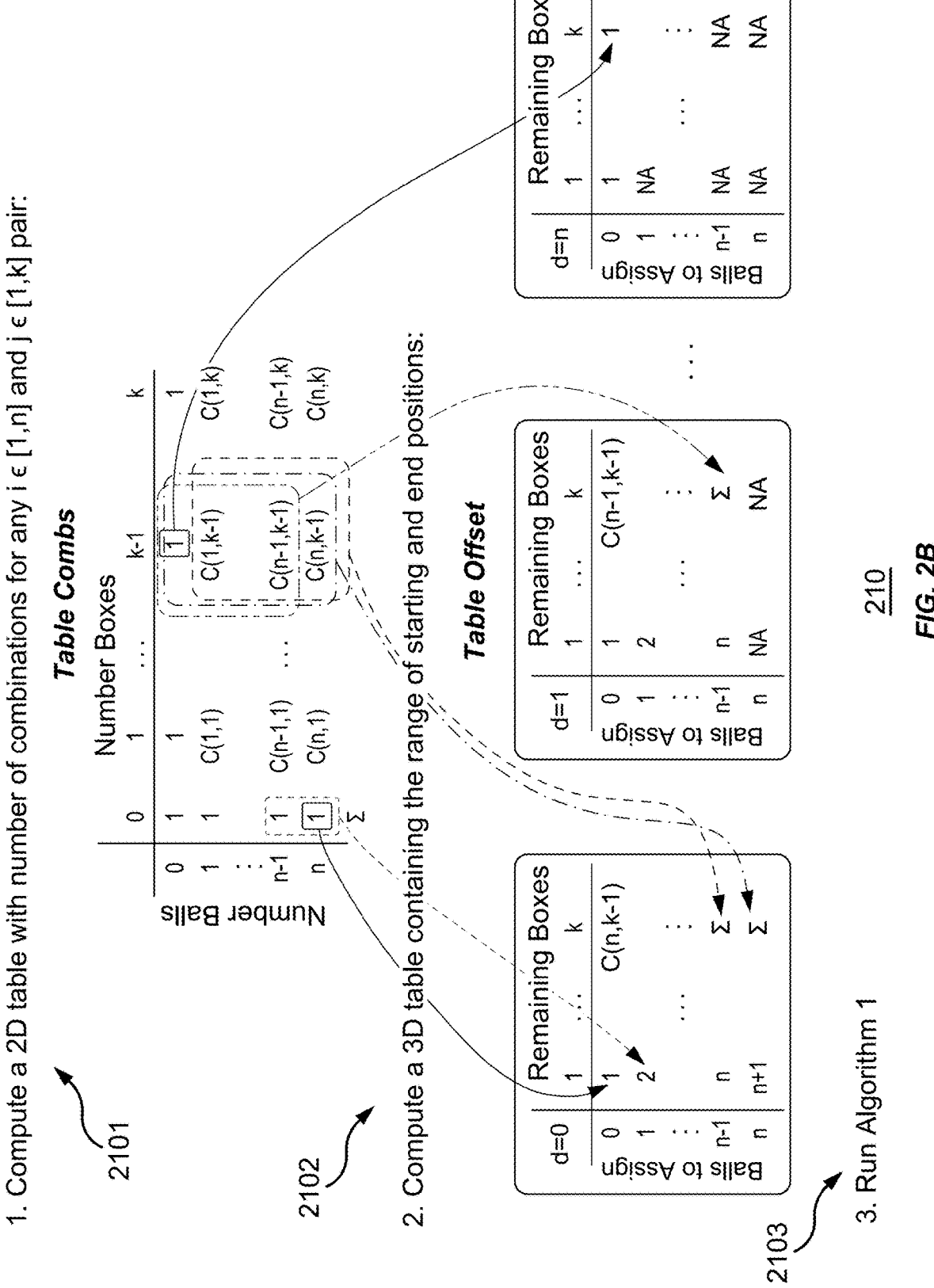
FIG. 2B is a flow for a random access method for combinations applied to an allocation analysis in accordance with various aspects described herein.

As shown in FIG. 2B, the pipeline or flow 210 of an exemplary methodology can include computing a 2D table at 2101 with a number of combinations for any $i \in [1,n]$ and $j \in [1,k]$ pair:

$$TableCombs_{ij} = C(i, j)$$

and $$TableCombs_{0j} = TableCombs_{j0} = 1$$

At 2102, a 3D table can then be computed containing the range of starting and end positions, with respect to the table with all the combinations, summarizing the number of items/balls to be assigned to each position within those ranges for each bin. Using as indices b, c, d where $b \in [0,n]$ and $b \leq (n-d)$ is the number of items/balls that need to be assigned, $c \in [1,k]$ is the number of remaining bins or boxes and $d \in [0,n]$ is the number of items/balls preassigned to previous bins, TableOffset can be computed by summing up elements from TableCombs as:

$$TableOffset_{bcd} = \sum_{i=n-b-d}^{n-d} TableCombs_{i,c-1}$$

Each combination of the analysis can be generated independently given a row ID, and storing the result in balls_assigned[k] as follows at 2103 (applying Algorithm 1):

```
generateCombination(ID, balls_assigned[n]):
    assigned_balls = 0
    row_offset = ID
    for bin c in [n..1]:
        balls_assigned[c] = binarySearch (TableOffset :, c, assigned_balls,
    row_offset)
        if balls_assigned[c] > 0:
            row_offset = row_offset −
            TableOffset_{balls_assigned[c]−1, c, assigned_balls}
            assigned_balls = assigned_balls + balls_assigned[c]
    balls_assigned[0] = n − assigned_balls
```

In one or more embodiments, the function binarySearch can run a binary search algorithm with the first argument being a vector where one wants to search, and with the second element being the element to search. It returns the position of the element within the vector. If the element is not present, it returns the position where it would go in a sorted sequence. The use of or following the flow 210 (in whole or in part) provides efficiency in resource usage and time savings, since each combination can be generated in a time complexity of $O(k \log(n))$.

Figure 2C:
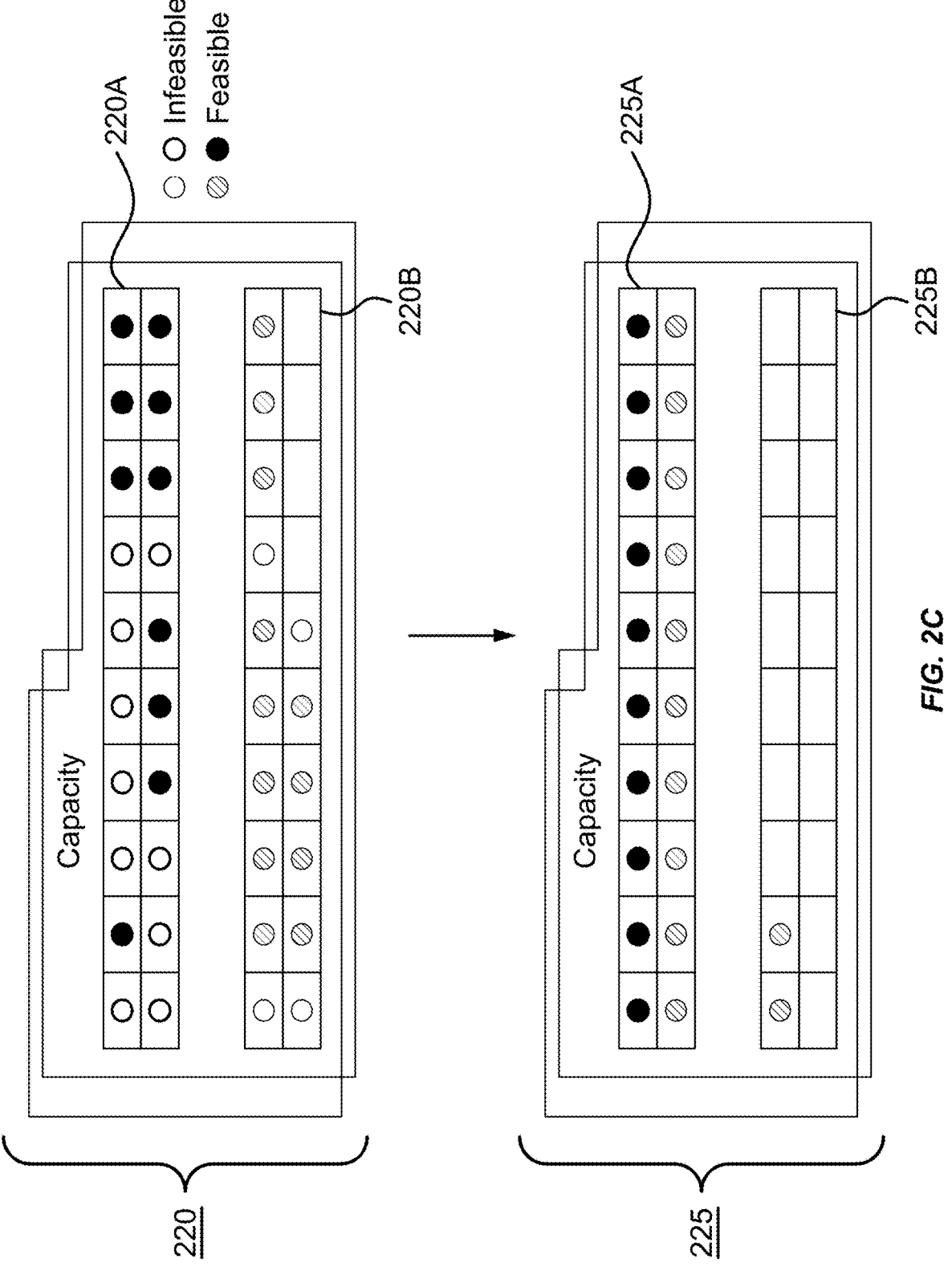
FIG. 2C is an example of repackaging in accordance with various aspects described herein.

As illustrated in FIG. 2C (and further described with respect to the repackaging of FIG. 2D), system 150 can further enhance system efficiencies in various analyses (e.g., financial asset allocation optimizations) by discarding infeasible or invalid combinations at 225, which leaves more capacity to accommodate feasible or valid solutions, thereby reducing the size of the analysis or problem. This is illustrated by the repackaging of validated combinations in partitions 225A, B, as compared to the earlier assignment of combinations in partitions 220A, B.

As an example, this can be done with the assistance of a random access method for the combinations (e.g., in the Balls & Bins analysis described above) since combinations can be generated independently. After creating sets of combinations, a vector of 0 or 1 can be created that signifies whether or not this combination is being selected. For instance, only valid combinations can be selected until capacity is reached as shown in partition 225, which saves memory and compute time. In some instances, it has been found that more than half of all the total combinations were not valid or feasible or otherwise were not to be selected. By framing the model this way, an analysis that was once unachievable can be streamlined to return selections or allocations (e.g., optimized) in a limited amount of time.

Figure 2D:
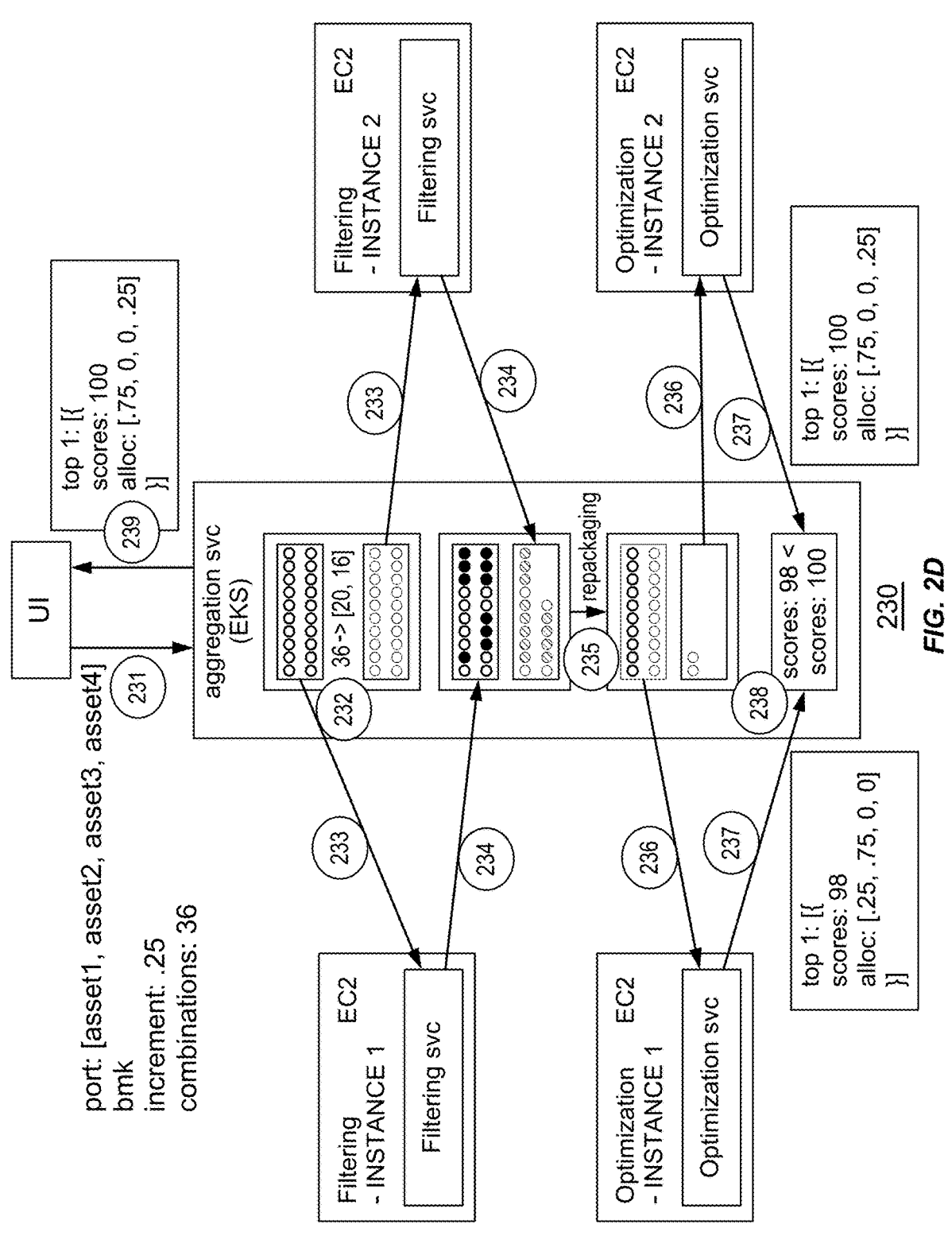
FIG. 2D illustrates a flow of an exemplary methodology which can be performed in whole or in part by the system of FIG. 1.

Referring to FIG. 2D, a flow 230 of an exemplary methodology is illustrated which can be performed or otherwise followed in whole or in part in the system 150. Flow 230 is illustrated as being applied to a request for a financial portfolio optimization, but as described herein other allocation analyses can be performed in the same or similar manner through parallel processing and combination validity pruning. Further, flow 230 is illustrated utilizing particular components and functionality, such as AWS, EKS, EC2 instances and so forth; however, various other components and functionality associated with various other entities can be utilized, such as for parallel processing; cloud computing; automatic scaling and management; creation of virtual servers; deep learning; monitoring complete stack (e.g., applications, infrastructure, network, and services) and utilizing alarms, logs, and events data to take automated actions; and so forth.

At 231, a User Interface (UI) can dispatch a comprehensive set of information or instructions to an aggregation service platform. As an example, the information or instructions can be regarding a portfolio to be optimized, including specific assets, investment parameters, incremental values, and/or objective functions and constraints. This information can be based on user input and/or derived from user input such as questions regarding risk assessment, and so forth. To illustrate the dataflow, a hypothetical scenario with a modest exemplary 4 assets characterized by a 0.25 increment, would yield 36 combinations; however, the computational complexity substantially escalates in practical contexts such as where a 16-asset portfolio, with an increment of 0.05, would yield 3,247,943,160 unique combinations.

Continuing with the modest example of 4 assets, at 232, if a fixed unit of 20 was employed, then the aggregation service would segregate (through use of Algorithm 1 described above and as illustrated by FIG. 2B) the 36 combinations into two distinct partitions, 20 and 16 combinations, respectively. It should be understood that other fixed units could be employed, such as depending on the processing capability, power, capacity and resources. For example, the fixed unit could be significantly augmented, potentially reaching values of much larger magnitude, such as one million or more.

At 233, each partition can be routed to a filtering service, such as residing on designated EC2 instances. In one embodiment, the routing can be facilitated through an application load balancer. In the example of flow 230, only two instances are depicted, however, the scalability is evidenced by its ability to expand dynamically, accommodating a multitude of instances as necessitated by the GPU utilization data gleaned from monitoring resource utilization such as through CloudWatch. In response to constrained memory resources, the aggregation service platform can temporarily halt the transmission of partitions to the filtering service platform such as upon a generation of repackaged partitions that surpasses a maximum threshold, as dictated by step 235. Similarly, transmission of partitions can recommence once repackaged partitions, as produced by step 235, fall below the aforementioned threshold. For example, a producer-consumer paradigm can be implemented, which is facilitated through the utilization of a blocking queue.

At 234, the filter service platform can evaluate every combination within the respective partitions. Within the context of the depicted dataflow diagram of FIG. 2D, the initial partition yields a validated count of 10 out of 20 combinations, while the subsequent partition produces 12 out of 16 valid combinations. This culminates in a total of 22 vetted combinations, signifying a pruned and refined dataset.

At 235, the aggregation service platform can orchestrate a refinement process, consolidating all validated combinations. In this example, subsequently, the 22 vetted combinations are divided into two partitions, 20 and 2 valid combinations, respectively. At 236, these newly repackaged partitions can be systematically dispatched to the optimization service platform, such as deployed on dedicated EC2 instances. In one or more embodiments, dispatching or assigning to the optimization service platform can be enabled by the sophisticated orchestration capabilities of the application load balancer.

At 237, the optimization service platform can analyze or otherwise scrutinize each repackaged partition by applying or otherwise leveraging algorithm(s) to ascertain optimal outcome(s). In one embodiment, the optimization service platform can exclusively return the foremost result for each partition; however, in other embodiments, the configurability of system 150 and flow 230 allows seamless customization which enables users, administrators or other entities to specify the desired volume for the outcomes volume, such as the top 1, top 2, top 3, or even the top 100 (or more) results. At 238, upon receipt of optimized results, the aggregation service platform can systematically consolidate the outcomes from each partition. This aggregation process can culminate in the formulation of the final top results for the comprehensive portfolio. At 239, the conclusive top results, which have been derived and refined through the dataflow process described herein, can be transmitted back to the UI or otherwise disseminated or provided to other entities seeking this information.

In one or more embodiments, a framework is provided that considers the impact of combinatorial issues with respect to their role in allocation decisions, such as investment decisions. In one or more embodiments, the framework can be utilized for locating the top N possible answers given a set of objectives and constraints, such as in a portfolio construction problem. In one or more embodiments, by leveraging a robust optimization framework, several optimal portfolios can be constructed that balances different competing objectives, such as tracking errors and Sharpe ratio while considering multiple constraints. In one or more embodiments, the framework can perform analysis regardless of whether the problem is convex or non-convex. Convexity can make the search for an optimal solution easier, predictable, and guaranteed. Non-convex problems on the other hand can be complex and more computationally challenging. Most non-convex optimization problems are tackled by heuristic procedures, which produces sub-optimal outcomes. In one or more embodiments, since the framework allows analyzing through every possibility, sub-optimal outcomes are not considered and the framework refrains from displaying different local optimal portfolios which are not desired.

In one or more embodiments, a system is provided that allows responding to a client in real-time, near real-time or within a determined satisfactory response time where the client seeks to see several optimal examples of how to reach their goals while applying particular constraints, risk-management and/or maintaining some conviction. In one or more embodiments, the system can customize at scale with the parameters specified by the user to produce economically meaningful results, which traditional methodologies cannot do. In this example, users have the option to change a wide array of parameters, such as risk preferences, allocation size, step size, trade size, and so forth among many others to create outcomes that reflect the investing preferences of the client or user.

Referring to FIG. 2E, data is shown comparing the performance of the method of the embodiments described herein with an existing sequential method. In this comparison, the algorithm of the exemplary embodiments was benchmarked on different GPUs and with different precision, using as a baseline the available recurrent-sequential Python CPU solution (running on an Intel® Xeon® Platinum 8259CL CPU @ 2.50 GHz) for comparison. In table 240, throughput is compared, in combinations per second, that each version of the algorithm and different settings can achieve for a case with 12 different portfolio accounts containing a total of 116 investment vehicles. As can be seen from the data, an improvement of 272× on NVIDIA V100 GPU is achieved using the exemplary embodiment of the parallel processing and FP64 precision with respect to the baseline in FP64. If FP16 precision was used in the exemplary methodology, up to a 692× improvement can be achieved with respect to the baseline in FP64.

Figure 2F:
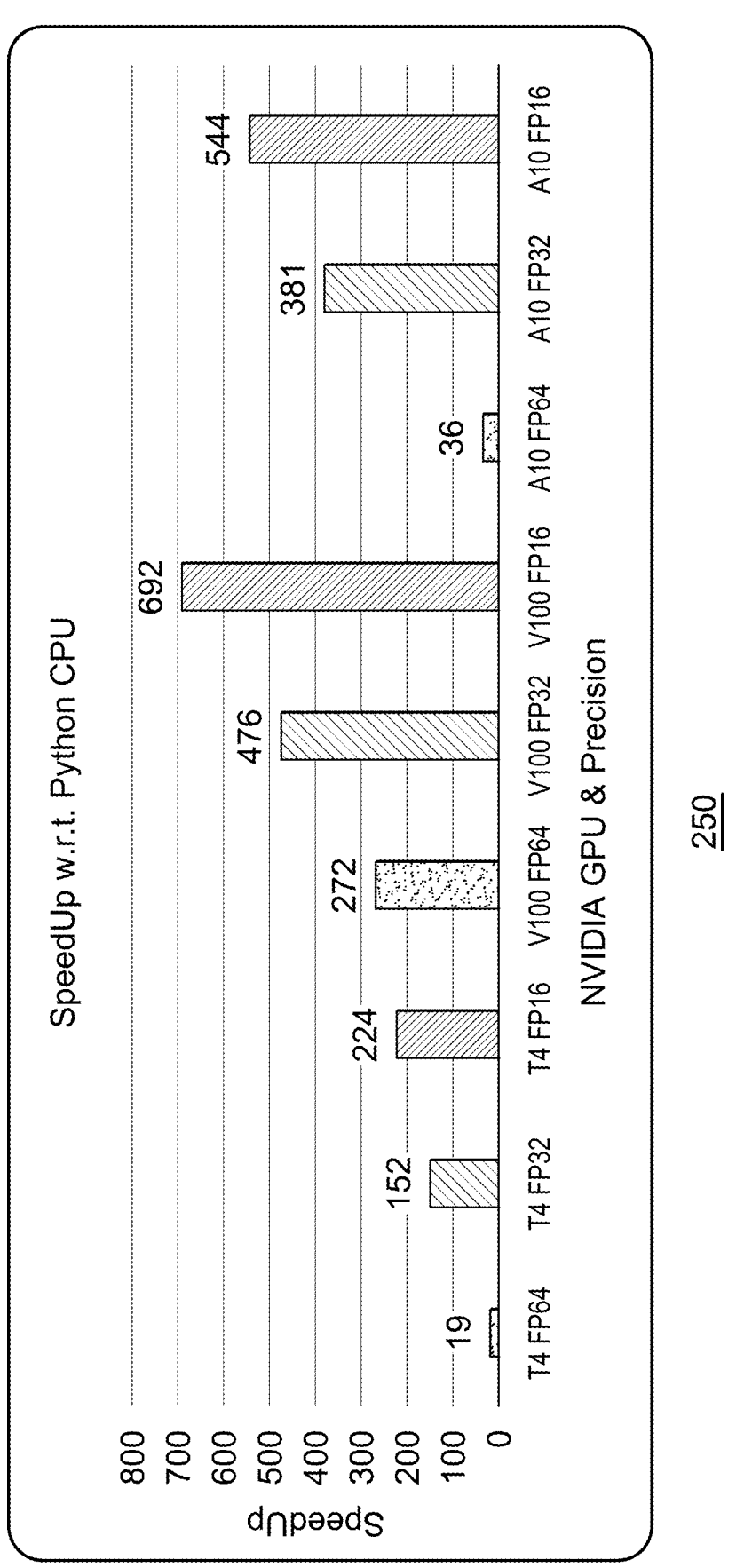
FIG. 2F is a table showing speedup data for an exemplary embodiment and for a sequential-recurrent CPU solution and parallel GPU solutions.

Referring to FIG. 2F, data 250 is shown comparing the speedup achieved by each of these different combinations of devices-precision described above with respect to the baseline (recurrent-sequential Python CPU).

Referring to FIG. 2G, data 260 is shown comparing the latency achieved by the method of the embodiments described herein (i.e., parallel) on 8×NVIDIA V100 GPUs as compared to the recurrent-sequential CPU solution when generating and computing all the portfolio combinations, for a portfolio with 12 different accounts & cash account (total of 116 investment vehicles) and varying the step size of the assignments (from 1% to 5%). As shown by this data, it can be observed that for step sizes larger than 2%, using the parallel processing methodology of the exemplary embodiments allows obtaining the results or solution in real time; however, the recurrent-sequential version takes several hours to obtain a solution. When a step size of 2% is utilized, it becomes computationally intractable for the recurrent-sequential version given the large response time (475 days), whereas the exemplary parallel processing methodology can obtain a response or solution in less than 3 hours. With a step size of 1%, the response time is large even using the parallel processing methodology on 8×NVIDIA GPUs, however, given the fact that the parallel processing methodology is completely parallel more computational resources can be dedicated to the analysis which can render these cases tractable or manageable.

Referring to FIG. 2H, data 270 is shown where the step size is fixed to 5% and the number of portfolio accounts is increased, which directly corresponds with larger number of combinations. Data 270 shows a comparison of the latency achieved by the exemplary parallel processing methodology on 8×NVIDIA V100 GPUs versus the recurrent-sequential CPU version when varying the number of portfolio accounts. As can be seen from data 270, the response time quickly becomes extremely large for the recurrent-sequential CPU solution, whereas the exemplary parallel processing methodology (see Parallel/8×NVIDIA V100 GPUs/FP32 column) is able to compute all the cases in less than 12 minutes.

In this example, a user can specify concentration constraints (see last column of the table). Specifically, the concentrations constraints for 12 portfolio accounts & cash are the following (the remaining accounts do not include constraints):

min_concentrations=[0.36, 0.02, 0.0, 0.0, 0.0, 0.0, 0.0, 0.0, 0.0, 0.21, 0.0, 0.0, 0.01]

max_concentrations=[0.63, 0.15, 0.1, 0.1, 0.05, 0.1, 0.1, 0.05, 0.05, 0.53, 0.13, 0.05, 0.08]

Continuing with this example, with these constraints the number of feasible combinations is reduced significantly, less than 0.0005% of the total. Since the exemplary parallel processing methodology first filters these combinations, it only requires a minimal computation for all the discarded combinations (only the generation). This computational saving strategy allows the exemplary parallel processing methodology to achieve up to 5.6× speedup with respect to the parallel version on GPU without filtering combinations, and up to 21400× speedup with respect to the sequential version on CPU without filtering combinations.

The data 270 also shows how quickly the response time becomes extremely large for the recurrent-sequential CPU solution, whereas the exemplary parallel processing methodology is able to compute all the cases in less than 12 minutes. This indicates that the multi-threaded approach of the exemplary parallel processing methodology to solve large scale combination problems based on a random-access method reformulation for the combinatorial problem becomes more significant as portfolio size increases, without adversely affecting the quality of the analysis or solution.

Figure 3:
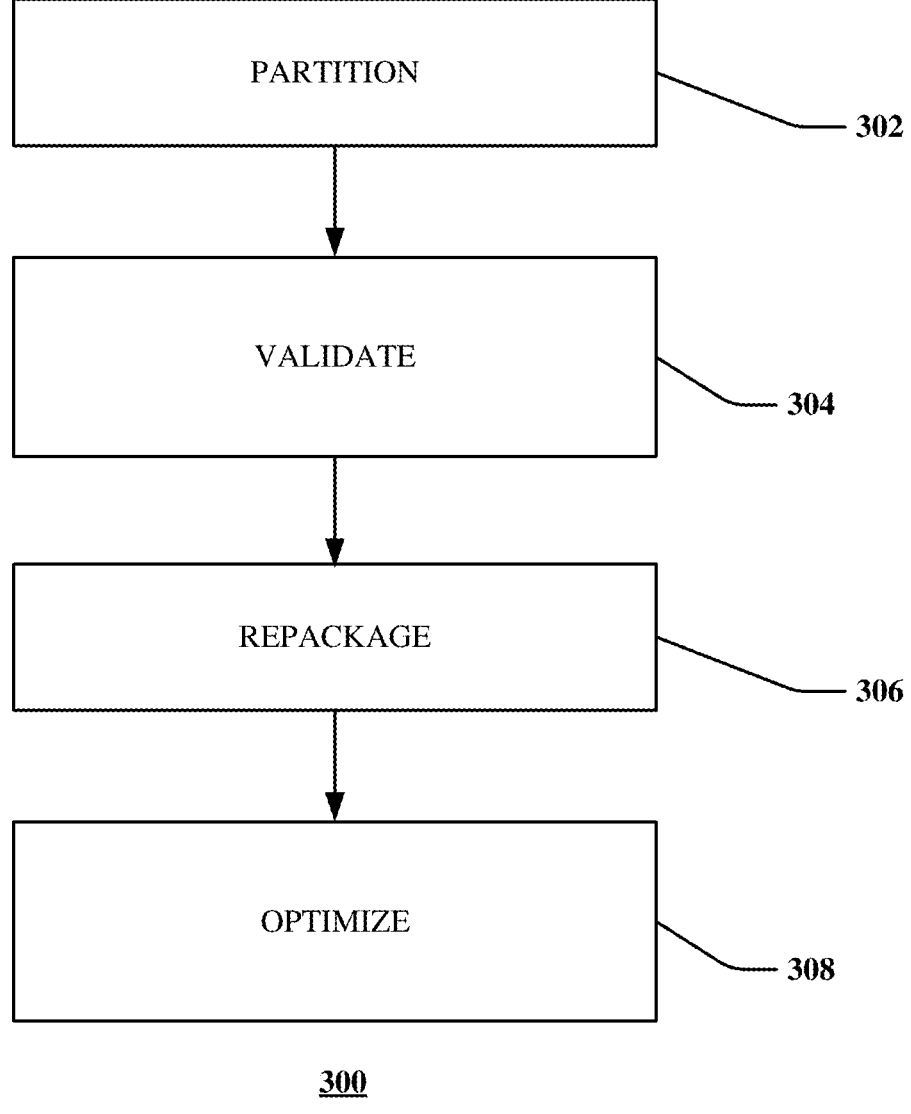
FIG. 3 depicts an illustrative embodiment of a method in accordance with various aspects described herein.

FIG. 3 depicts an illustrative embodiment of a method 300 in accordance with various aspects described herein. At 302, partitioning can be performed for identifying optimized allocations, such as in an investment strategy involving financial assets, investment parameters, increments for the investments, and so forth. In one embodiment, other criterion can also be used which can be applied to optimizing the portfolio and/or pruning the combinations based on feasibility. As an example, a request for investment strategies can be received which causes segregating unique combinations for a portfolio of the financial assets into partitions. For instance, a number of the unique combinations can be based on a number of the financial assets and can be based on a selected incremental value.

At 304, validation can be performed for identifying feasible or valid combinations, such as according to concentrations constraints. For example, for each portfolio account, the user can specify two types of constraints: 1. minimum % to be assigned to the asset; and 2. maximum % to be assigned to the asset. For any unique combination, if one of its assignments is not between the minimum and maximum associated to the different portfolio assets, then the combination is considered non-feasible and therefore discarded at the validation stage. For instance, the partitions can be routed or otherwise provided to a filtering service platform to cause the filtering service platform to evaluate validity for each of the unique combinations of the partitions resulting in validated combinations. In one or more embodiments, other criteria or constraints can be utilized for validation, such as types of financial assets.

At 306, repackaging of the validated combinations for the portfolio of the financial assets into refined partitions can be performed. At 308, optimization via parallel processing can be performed. For example, the refined partitions can be routed to an optimization service platform. The optimization service platform can include GPUs which apply, via parallel processing by the GPUs, an optimization investment algorithm according to investment parameters and analyze each of the validated combinations of the refined partitions resulting in optimal outcomes for each of the refined partitions.

In one or more embodiments, the optimal outcomes for each of the refined partitions can be consolidated to determine a suggested portfolio selected from the financial assets. In one or more embodiments, a response for the investment strategies can be generated, which identifies the suggested portfolio selected from the financial assets. In one or more embodiments, the routing of the refined partitions to the filtering service platform is via an application load balancer. In one or more embodiments, the routing of the partitions to the optimization service platform is via an application load balancer. In one or more embodiments, the filtering service platform utilizes instances associated with the first GPUs. In one or more embodiments, the optimization service platform utilizes instances associated with the second GPUs.

In one or more embodiments, the request is generated at a user interface of an end user device. In one or more embodiments, the providing of the response for the investment strategies is to the user interface of the end user device. In one or more embodiments, the consolidating of the optimal outcomes includes ranking of outcomes. In one or more embodiments, the request identifies the financial assets, the investment parameters, and the incremental value generated based on user input at an end user device.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It should be further understood that various computing environments can be utilized to facilitate, in whole or in part, providing optimal allocations by generating independently any of the possible combinations and applying parallelized processing which takes advantage of multi/many-core architectures such as GPUs. Since combinations can be generated independently, they do not need to all be kept in memory simultaneously, and instead they can be generated iteratively which alleviates memory requirement issues.

In one or more embodiments, program modules can be utilized which comprise routines, programs, components, data structures, etc., that perform particular tasks or implement particular abstract data types. Moreover, those skilled in the art will appreciate that the methods in whole or in part can be practiced with other computer system configurations, such as comprising multiprocessor computer systems, minicomputers, mainframe computers, as well as personal computers, hand-held computing devices, microprocessor-based or programmable consumer electronics, and the like, each of which can be operatively coupled to one or more associated devices, such as for accessing cloud computing that provides for parallel processing functionality.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

In one or more embodiments, a user can enter commands and information into a computer through one or more wired/wireless input devices, e.g., a keyboard and a pointing device, such as a mouse. Other input devices can comprise a microphone, an infrared (IR) remote control, a joystick, a game pad, a stylus pen, touch screen or the like. These and other input devices are often connected to a processing unit through an input device interface that can be coupled to a system bus, but can be connected by other interfaces, such as a parallel port, an IEEE 1394 serial port, a game port, a universal serial bus (USB) port, an IR interface, etc. In one or more embodiments, the computer can interface or otherwise interact with various other devices that provide some or all of the functionality described herein, including devices or functionality as described in FIG. 1.

A monitor or other type of display device can be also connected to the system bus via an interface, such as a video adapter. It will also be appreciated that in alternative embodiments, a monitor can also be any display device (e.g., another computer having a display, a smart phone, a tablet computer, etc.) for receiving display information associated with computer via any communication means, including via the Internet and cloud-based networks. In addition to the monitor, a computer typically comprises other peripheral output devices (not shown), such as speakers, printers, etc.

The computer can operate in a networked environment using logical connections via wired and/or wireless communications to one or more remote computers, such as a remote computer(s). The remote computer(s) can be a workstation, a server computer, a router, a personal computer, portable computer, microprocessor-based entertainment appliance, a peer device or other common network node, and typically comprises many or all of the elements described relative to the computer.

When used in a WAN networking environment, the computer can comprise a modem or can be connected to a communications server on the WAN or has other means for establishing communications over the WAN, such as by way of the Internet. The modem, which can be internal or external and a wired or wireless device, can be connected to the system bus via the input device interface. In a networked environment, program modules depicted relative to the computer or portions thereof, can be stored in the remote memory/storage device. It will be appreciated that the network connections shown are example and other means of establishing a communications link between the computers can be used.

The computer can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

receiving, by an aggregation service platform including a processor, a request for investment strategies;

segregating, by the aggregation service platform, unique combinations for a portfolio of financial assets into partitions, wherein a number of the unique combinations is based on a number of the financial assets and is based on an incremental value;

routing, by the aggregation service platform, the partitions to a filtering service platform comprising first Graphics Processing Units (GPUs) to cause the filtering service platform to evaluate validity for each of the unique combinations of the partitions resulting in validated combinations;

repackaging, by the aggregation service platform, the validated combinations for the portfolio of the financial assets into refined partitions;

routing, by the aggregation service platform, the refined partitions to an optimization service platform comprising second GPUs to cause the optimization service platform to apply, via parallel processing by the second GPUs, an optimization investment algorithm according to investment parameters and analyze each of the validated combinations of the refined partitions resulting in optimal outcomes for each of the refined partitions;

consolidating, by the aggregation service platform, the optimal outcomes for each of the refined partitions to determine a suggested portfolio selected from the financial assets; and providing, by the aggregation service platform, a response for the investment strategies, the response identifying the suggested portfolio selected from the financial assets.

2. The method of claim 1, wherein the routing of the refined partitions to the filtering service platform is via an application load balancer.

3. The method of claim 1, wherein the routing of the partitions to the optimization service platform is via an application load balancer.

4. The method of claim 1, wherein the filtering service platform utilizes instances associated with the first GPUs.

5. The method of claim 1, wherein the optimization service platform utilizes instances associated with the second GPUs.

6. The method of claim 1, wherein the request is generated at a user interface of an end user device, and wherein the filtering service platform evaluates the validity for each of the unique combinations of the partitions according to minimum and maximum percentages to invest into one or more of the portfolio of financial assets.

7. The method of claim 6, wherein the providing of the response for the investment strategies is to the user interface of the end user device.

8. The method of claim 1, wherein the consolidating of the optimal outcomes includes ranking of outcomes.

9. The method of claim 1, wherein the request identifies the financial assets, the investment parameters, and the incremental value generated based on user input at an end user device.

10. A system, comprising:

an aggregation service platform including a processor;

a processing system including one or more other processors; and a memory that stores executable instructions that, when executed by the processing system and the processor of the aggregated service platform, facilitate performance of operations, the operations comprising:

receiving, by the processing system, user input for a request for investment strategies, the request being associated with financial assets, investment parameters, and an incremental value;

providing the request from the processing system to the aggregation service platform;

segregating, by the processor of the aggregation service platform, unique combinations for a portfolio of the financial assets into partitions, wherein a number of the unique combinations is based on the incremental value and a number of the financial assets;

routing, by the processor of the aggregation service platform, the partitions to a filtering service platform comprising first Graphics Processing Units (GPUs) to cause the filtering service platform to evaluate validity for each of the unique combinations of the partitions resulting in validated combinations;

repackaging, by the processor of the aggregation service platform, the validated combinations for the portfolio of the financial assets into refined partitions;

routing, by the processor of the aggregation service platform, the refined partitions to an optimization service platform comprising second GPUs to cause the optimization service platform to apply, via parallel processing by the second GPUs, an optimization investment algorithm according to the investment parameters and analyze each of the validated combinations of the refined partitions resulting in optimal outcomes for each of the refined partitions;

consolidating, by the processor of the aggregation service platform, the optimal outcomes for each of the refined partitions to determine a suggested portfolio selected from the financial assets;

receiving, by the processing system, a response for the investment strategies from the aggregation service platform, the response identifying the suggested portfolio selected from the financial assets; and presenting, by the processing system, the suggested portfolio.

11. The system of claim 10, wherein routing of the partitions to the filtering service platform is via an application load balancer, and wherein routing of the refined partitions to the optimization service platform is via an application load balancer.

12. The system of claim 10, wherein the filtering service platform utilizes instances associated with the first GPUs, and wherein the optimization service platform utilizes instances associated with the second GPUs.

13. The system of claim 10, wherein the request is generated at a user interface of an end user device, and wherein the providing of the response for the investment strategies is to the user interface of the end user device.

14. The system of claim 10, wherein consolidating of the optimal outcomes includes ranking of outcomes, and wherein the request identifies the financial assets, the investment parameters, and the incremental value generated based on user input at an end user device.

15. A non-transitory computer-readable medium, comprising executable instructions that, when executed by a processing system including a processor of an aggregation service platform, facilitate performance of operations, the operations comprising:

receiving a request for investment strategies;

segregating unique combinations for a portfolio of financial assets into partitions, wherein a number of the unique combinations is based on a number of the financial assets and is based on an incremental value;

routing the partitions to a filtering service platform comprising first Graphics Processing Units (GPUs) to cause the filtering service platform to evaluate validity for each of the unique combinations of the partitions resulting in validated combinations;

repackaging the validated combinations for the portfolio of the financial assets into refined partitions;

routing the refined partitions to an optimization service platform comprising second GPUs to cause the optimization service platform to apply, via parallel processing by the second GPUs, an optimization investment algorithm according to investment parameters and analyze each of the validated combinations of the refined partitions resulting in optimal outcomes for each of the refined partitions;

consolidating the optimal outcomes for each of the refined partitions to determine a suggested portfolio selected from the financial assets; and providing a response for the investment strategies, the response identifying the suggested portfolio selected from the financial assets.

16. The non-transitory computer-readable medium of claim 15, wherein the routing of the refined partitions to the filtering service platform is via an application load balancer.

17. The non-transitory computer-readable medium of claim 15, wherein the routing of the partitions to the optimization service platform is via an application load balancer.

18. The non-transitory computer-readable medium of claim 15, wherein the filtering service platform utilizes instances associated with the first GPUs.

19. The non-transitory computer-readable medium of claim 15, wherein the optimization service platform utilizes instances associated with the second GPUs.

20. The non-transitory computer-readable medium of claim 15, wherein the request is generated at a user interface of an end user device, and wherein the filtering service platform evaluates the validity for each of the unique combinations of the partitions according to minimum and maximum percentages to invest into one or more of the portfolio of financial assets.

* * * * *